United States Patent [19]

Hildebrand

[11] Patent Number: 5,299,271

[45] Date of Patent: Mar. 29, 1994

[54] SYSTEM AND METHOD OF EMBEDDING OPTICAL FIBERS IN HONEYCOMB PANELS

[75] Inventor: Gregory C. Hildebrand, Rio Linda, Calif.

[73] Assignee: The United States of America as represented by the Secretary of the Air Force, Washington, D.C.

[21] Appl. No.: 33,082

[22] Filed: Feb. 26, 1993

[51] Int. Cl.⁵ .................. G02B 6/00; G02B 6/42
[52] U.S. Cl. .......................... 385/12; 385/88; 385/128; 250/227.14; 356/73.1
[58] Field of Search ............... 385/12, 13, 24, 88, 385/92, 94, 126, 127, 128, 135, 138, 139; 372/6, 71; 250/227.14, 227.18, 227.21, 227.28; 356/73.1, 342, 445, 448

[56] References Cited

U.S. PATENT DOCUMENTS

| | | | |
|---|---|---|---|
| 4,367,040 | 1/1983 | Goto | 356/44 |
| 4,432,599 | 2/1984 | McMahon | 250/227.14 |
| 4,516,022 | 5/1985 | Lindgren | 250/227.11 |
| 4,603,252 | 7/1986 | Malek et al. | 250/227.14 |
| 4,629,318 | 12/1986 | Malek et al. | 356/237 |
| 4,673,245 | 6/1987 | Kling et al. | 385/80 |
| 4,710,353 | 12/1987 | Tanaka et al. | 422/68 |
| 4,805,985 | 2/1989 | Fleck | 385/12 |
| 4,842,357 | 6/1989 | Doneen | 385/12 |
| 4,846,343 | 7/1989 | Rupert | 206/303 |
| 4,936,649 | 6/1990 | Lymer et al. | 385/13 |
| 5,168,156 | 12/1992 | Fischer et al. | 250/227.21 |
| 5,241,617 | 8/1993 | Peacock et al. | 385/135 |

*Primary Examiner*—Frank Gonzalez
*Attorney, Agent, or Firm*—Donald J. Singer; Irwin P. Garfinkle

[57] ABSTRACT

For the purpose on monitoring the condition in the interior of a closed metallic honeycomb panel, an optical fiber is embedded therein. An optical connector, secured within a groove has one end exposed to a source of external light, while the optical fibers are connected to the other end of the connector. In the example disclosed, the end of the optical fiber within the structure is coated with a sensor material subject to the same condition (corrosion) taking place within the structure. The reflectivity of the coating from a source of light applied through an optical connector is a measure of the condition.

18 Claims, 2 Drawing Sheets

SYSTEM AND METHOD OF EMBEDDING OPTICAL FIBERS IN HONEYCOMB PANELS

STATEMENT OF GOVERNMENT INTEREST

The invention described herein may be manufactured and used by or for the Government for governmental purposes without the payment of any royalty thereon.

FIELD OF THE INVENTION

This invention is for a system and method for embedding fiber optic corrosion sensors in closed composite panels or metal panel in such a manner as to allow nondestructive evaluation of corrosion damage with a sensitivity far greater than is currently possible.

BACKGROUND OF THE INVENTION

Honeycomb panels have many structural uses, including structures for various aircraft components. It is frequently useful to instrument these components for various purposes. One such purpose would be to monitor corrosion on the interior of a honeycomb panel. Current systems of nondestructively inspecting for corrosion on the interior of honeycomb panels and parts include X-ray, N-ray (neutron radiation), and coin tapping. Such methods are ineffective at detecting the early stages of corrosion. They also often require expensive facilities and trained technicians. A known fiber optic corrosion sensor exists which can detect corrosion in its early stages. The known sensor is entirely portable, and requires less training for the technician. This invention uses the known fiber optic sensor and provides the means for embedding it in a closed panel.

PRIOR ART

A search of the prior art revealed a number of prior art United States patents which used fiber optics for monitoring the interior of a composite structure. Lymer et al, U.S. Pat. No. 4,936,649 discloses optical fibers embedded into a composite structure for detecting damage. The fibers are weakened so that they break when stressed, and the system depends on such failures to detect over stressing of the structure. Malek et al, U.S. Pat. Nos. 4,603,252 and 4,629,318 disclose other complex systems in which detection results from the failure of the fibers. These patents all rely on the optical fibers being placed between plies of a composite structure during manufacture, and they all rely on the plies to be compliant enough to make room for the optical fiber. None of these patents discloses a system in which a system of fiber optics is embedded in a structure, and wherein the interior of the structure is monitored to determine the existence of damage, particularly corrosion.

SUMMARY OF THE INVENTION

A condition in the interior of a closed honeycomb panel, is monitored by means of an optical fiber embedded therein. An optical connector, secured within a groove in a wall of the panel has one end exposed to a source of external light, while the optical fibers are connected to the other end of the connector. For the purpose of measuring corrosion, an end of the optical fiber within the structure is coated with a sensor material subject to the same corrosion taking place within the structure. The reflectivity of the coating from a source of light applied through the optical connector is a measure of the corrosion.

OBJECTS OF THE INVENTION

It is an object of this invention to provide a method and means by which optical fibers can be embedded in the interior of a metal honeycomb panel.

Another object of this invention to provide a system and method by which an optical fiber can be embedded in the interior of a closed structure, the optical fiber serving to provide means for inspection within the structure.

Still another object of this invention to provide a honeycomb structure having a system for inspection incorporated therein, said system comprising fiber optic elements embedded in the honeycomb structure, and means for accessing the fiber optic elements so that inspection of the interior of the structure can be made in situ without disassembly of the part.

Yet another object of this invention to provide a closed structure having a system for inspection incorporated therein, said system comprising fiber optics having a corrosive coating embedded within the interior of said structure.

Another object of this invention is the provision of an optical fiber embedded within a corrosive closed panel, the end of said optical fiber within the structure being coated with a metal subject to the same corrosion taking place within the structure, the reflectivity of the coating being a measure of the degree of corrosion, and the provision of means to monitor said reflectivity

BRIEF DESCRIPTION OF THE DRAWINGS

These and other advantages, objects and features of the invention will become more apparent after considering the following description taken in conjunction with the illustrative embodiment in the accompanying drawings, in which.

DESCRIPTION OF THE PREFERRED EMBODIMENT

Figure 3:
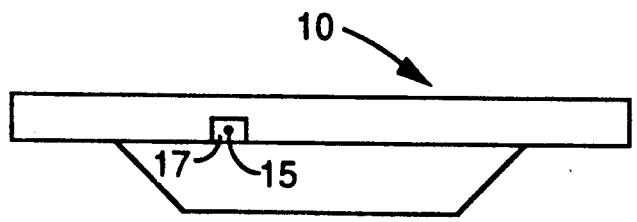
FIG. 3 is a front view of the embodiment of FIG. 1.
Figure 4:
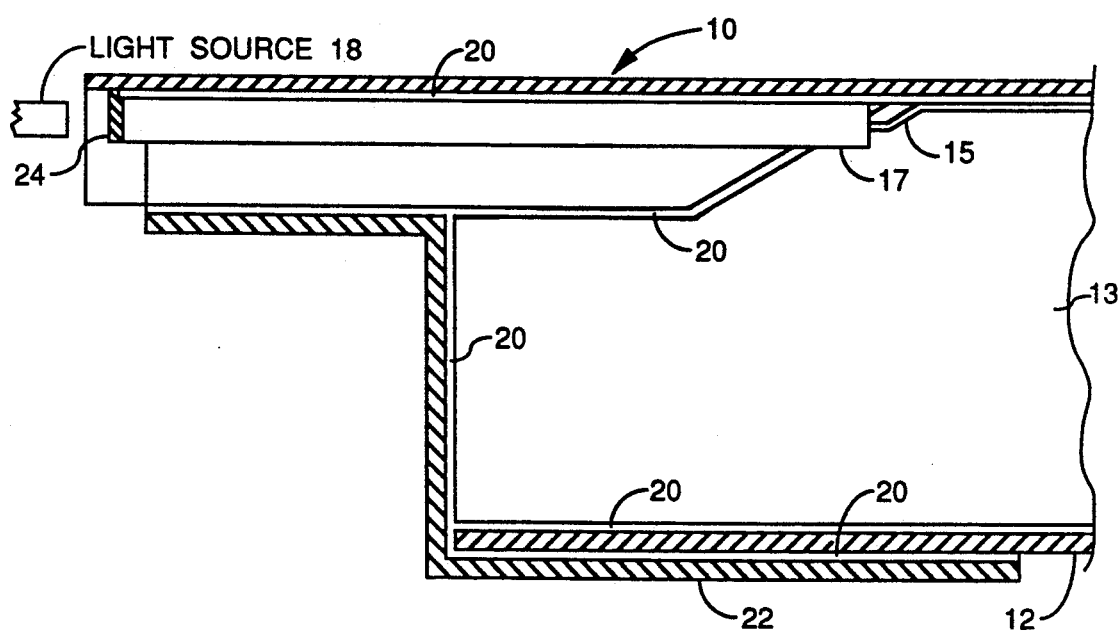
FIG. 4 shows an enlarged cross section of the honeycomb panel with the fiber optic devices of this invention embedded therein.

Referring to the drawings, there is illustrated a typical honeycomb panel 10 used as a structural component in an aircraft. The basic panel consists of an outer skin 11, an inner skin 12, and honeycomb 13 in a bonded sandwich configuration. The outer skin 11 is typically chem-milled and therefore is shown in the plan view of FIG. 3 with a chem-mill line 14. The skins are bonded together by means of an appropriate adhesive 20. A skin 22 is the closure for the panel.

The invention may incorporate a plurality of optical fibers, but for simplicity only one optical fiber 15 is shown. In the configuration illustrated, the optical fiber 15 includes several corrosion sensors 16 attached. In practice, a variety of sensor types may be used. The optical fiber 15 has one or more ends that go into a connector 17 for connection to an external light source 18 and data processing equipment (not shown). The external light source and the data processing equipment may be of any type suitable for the desired purpose. The connector 17 comprises a simple optical fiber splicing device which is made to hold the embedded optical fiber 15 permanently in place. There are at least two splicing devices suitable for this purpose with little or no modification. One is shown in U.S. Pat. No. 4,888,076 issue to Martin. The second is a device made by Rockwell International Corporation.

A groove or depression is formed in the thicker part of the outer skin 11 to allow placement of the connector 17. The connector 17 is held in place by cement or any other means. The external light source 18 is applied to the optical fiber 15 through the connector 17 by inserting the exposed optical fiber end into the connector 17. When external equipment is not in place, the connector 17 may require sealing from the environment. This is achieved by placing a thin film 24 of RTV over the exposed end of the connector. The film can then be scratched off when the connector 17 is to be used. Any alternative sealing method may also be used to protect the connector 17.

Figure 1:
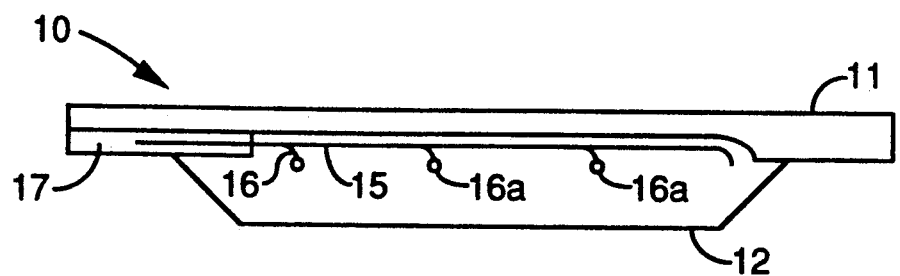
FIG. 1 is a schematic of a cut-away side view of a honeycomb panel having an optical sensor system in accordance with this invention.
Figure 2:
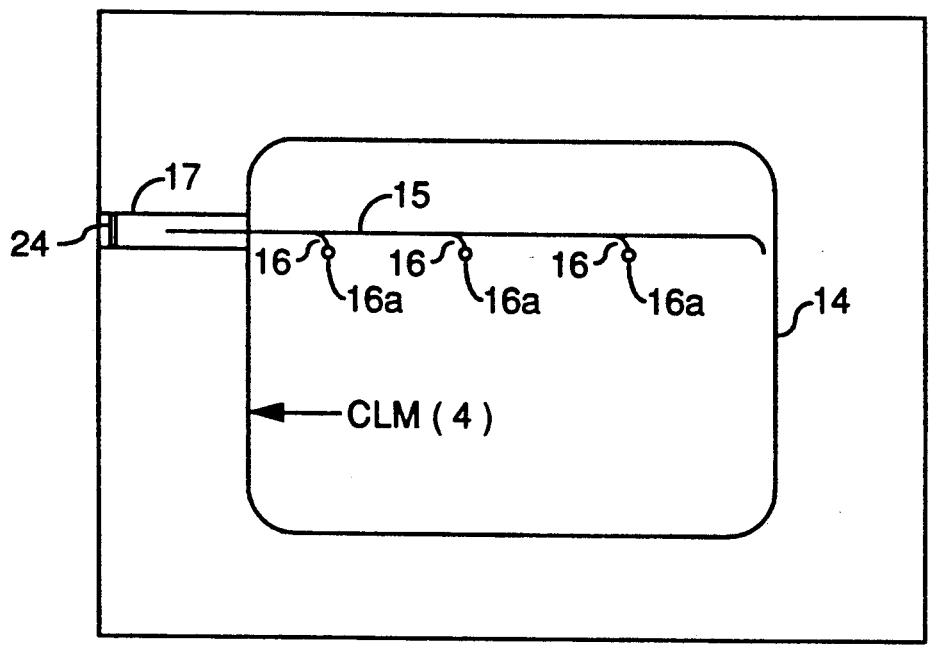
FIG. 2 is a plan view of the embodiment of FIG. 1.

In the illustrated embodiment of the invention, sensors 16, which are optical fibers, are used for the purpose of corrosion sensing. For that purpose, the fibers 16 are connected by conventional means to the fiber 15, and the ends are coated with a metallic substance 16a whose reflectivity is a function of the degree of corrosion. The coating 16a is made of a material having the same corrosive qualities as the panel structure, and therefore will provide a indication of the corrosion taking place within the structure. Also as shown in FIG. 1, all of the optical fibers 16 are coated with the corrosive coating 16a, except for one, which is left uncoated. That one fiber remains uncoated so that it is not sensitive to corrosion (or other condition being monitored) and will therefore serve as a reference to which the condition of the sensors 16 can be compared.

ADVANTAGES AND NEW FEATURES

This invention uses fiber optic corrosion sensors embedded within a honeycomb panel, and it makes use of sensors that can be made very sensitive to the early stages of corrosion. Other methods of detecting corrosion inside honeycomb panels are not as sensitive. Also, this invention will allow a more objective inspection of the honeycomb panel, as compared to the more subjective current methods. As a result, the technicians doing the inspection will need less training.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A fiber optic inspection system for installation in a structure having walls interconnected to provide a closed structure, and means for optically monitoring an internal condition of said structure without disassembly, the combination comprising:
   a groove in one of said walls in the interior of said structure;
   a fiber optic connector positioned in said groove, said connector having an end optically accessible from outside said closed structure to enable the application of a source of light therethrough; and
   at least one optical fiber secured to said wall within said closed structure, said optical fiber being optically connected to the other end of said connector.

2. The system of claim 1, and a plurality of optical sensors optically connected to said optical fiber.

3. The system of claim 2 wherein said structure is metallic.

4. The system of claim 3, wherein said optical sensors comprising optical fibers end coated with a material whose reflectivity is a function of a condition within said structure.

5. The system of claim 4, and an additional sensor connected to said optical fiber, said additional sensor being insensitive to said condition to provide a reference for said system.

6. The system of claim 5, wherein said fibers are secured to said one wall by means of cement.

7. The system of claim 6, and means for protecting the exposed end of said connector.

8. The system of claim 7, wherein said condition is corrosion.

9. A fiber optic inspection system for installation in a closed metallic structure having an outer metallic wall, said metallic wall being subject to a condition, the combination comprising:
   at least one optical fiber secured to said wall within said closed structure.
   a plurality of optical sensors optically connected to said optical fiber, said optical sensors comprising optical fibers end coated with a material whose reflectivity is a function of said condition.
   a groove in said wall on the interior of said structure;
   a fiber optic connector embedded in said groove, said optical fiber being optically connected to one end of said connector, said connector having its opposite end optically accessible from outside said closed structure to enable the application of a source of light therethrough to the optical fibers and the sensors at the ends thereof.

10. The system of claim 9, and an additional sensor connected to said optical fiber, said additional sensor being uncoated, and therefore not subject to said condition, to provide a reference for the coated sensors.

11. The system of claim 10 wherein said fibers are secured to said one wall by means of cement.

12. The system of claim 11, and means for protecting the exposed end of said connector.

13. The system of claim 12 wherein said condition is corrosion.

14. A method for installation of a fiber optic inspection system in a closed structure having an outer wall, said wall being subject to a condition, the steps of:
   securing at least one optical fiber to said wall within said closed structure.
   providing a groove in said wall on the interior of said structure;
   embedding a fiber optic connector in said groove;
   optically connecting said optical fiber to one end of said connector, said connector having its opposite end optically accessible from outside said closed structure to enable the application of a source of light therethrough to the optical fibers and the sensors at the ends thereof.

15. The method of claim 14, and optically connecting a plurality of optical sensors to said optical fiber, said optical sensors comprising optical fibers end coated with a material whose reflectivity is a function of said condition.

16. The method of claim 15 and connecting an additional sensor to said optical fiber, said additional sensor being uncoated, and therefore not subject to said condition, to provide a reference for the coated sensors.

17. The system of claim 16, and protecting the exposed end of said connector.

18. The method of claim 17 wherein said condition is corrosion.

* * * * *